(12) United States Patent
Borghi

(10) Patent No.: US 7,313,977 B2
(45) Date of Patent: Jan. 1, 2008

(54) AUTOMATIC, MECHANICAL, CONTINUOUSLY VARIABLE TRANSMISSION, PARTICULARLY FOR A HEAVY-DUTY VEHICLE

(75) Inventor: Gianni Borghi, Albinea (IT)

(73) Assignee: Lombardini S.r.l., Reggio Emilia (IT)

( * ) Notice: Subject to any disclaimer, the term of this patent is extended or adjusted under 35 U.S.C. 154(b) by 412 days.

(21) Appl. No.: 10/763,404

(22) Filed: Jan. 22, 2004

(65) Prior Publication Data
US 2004/0171443 A1    Sep. 2, 2004

(30) Foreign Application Priority Data
Jan. 24, 2003   (IT)   ............. TO2003A0041

(51) Int. Cl.
*F16H 61/00*   (2006.01)
(52) U.S. Cl. ...................................... 74/13
(58) Field of Classification Search ............ 474/8, 474/12, 13, 14, 17, 69, 70
See application file for complete search history.

(56) References Cited
U.S. PATENT DOCUMENTS 3,830,112 A * 8/1974 Ward .................. 474/13
5,052,981 A * 10/1991 Robert ................ 474/14
5,328,413 A * 7/1994 Robert ................ 474/13
5,458,539 A * 10/1995 Landry ............... 474/13
2004/0082415 A1* 4/2004 Borghi ............... 474/13

FOREIGN PATENT DOCUMENTS

| DE | 298 22 749 | 4/1999 |
| EP | 0 898 096 | 2/1999 |
| EP | 1 413 805 | 4/2004 |
| GB | 753117 | 7/1956 |
| GB | 926886 | 5/1963 |
| GB | 2 047 823 | 12/1980 |

* cited by examiner

Primary Examiner—Vicky A. Johnson
(74) Attorney, Agent, or Firm—Ladas & Parry LLP

(57) ABSTRACT

A continuously variable transmission including an input shaft; a flywheel connected to the input shaft; a drive pulley connected to the input shaft and defined by a first and a second half-pulley defining a groove of variable width for a belt; and a centrifugal actuating assembly having a centrifugal actuating device, which activates above a first threshold value of the angular speed of the input shaft to connect the drive pulley to the flywheel by a clutch interposed between the first half-pulley and the flywheel, and a speed regulating device, which is active above a second threshold value of the angular speed of the input shaft to adjust the width of the groove of the drive pulley, and therefore the work diameter of the belt.

14 Claims, 3 Drawing Sheets

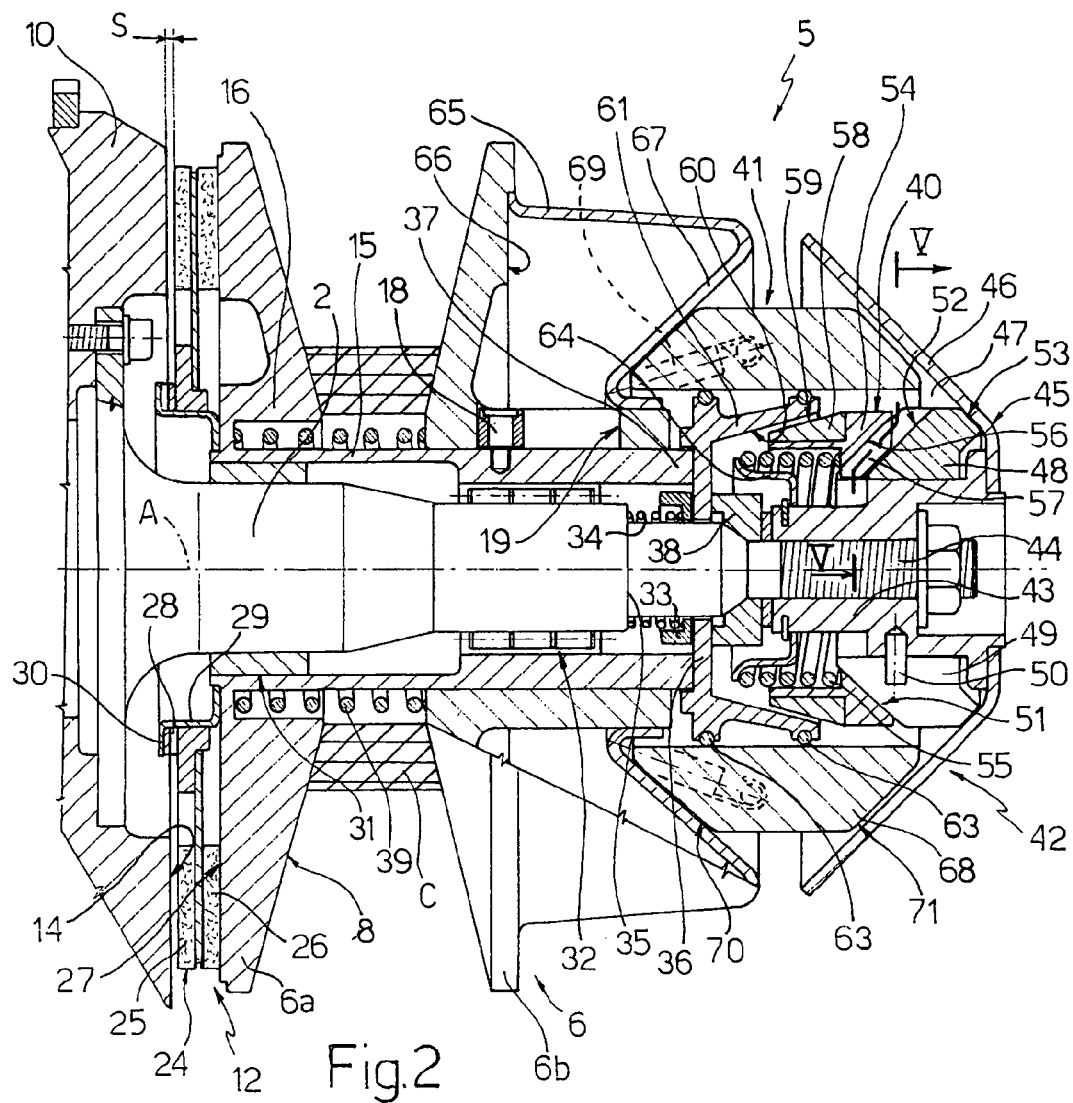
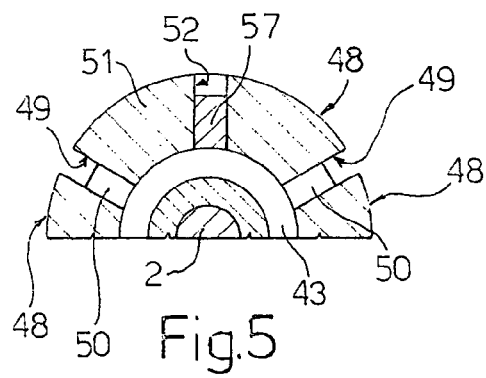
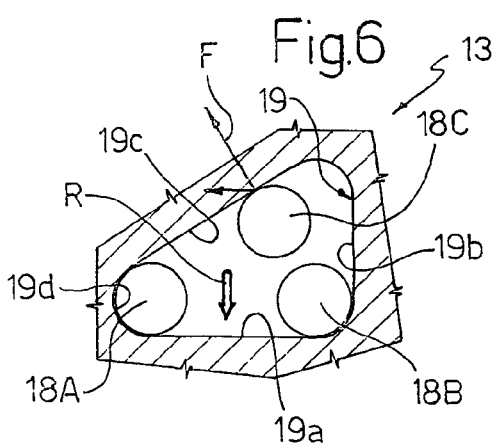

AUTOMATIC, MECHANICAL, CONTINUOUSLY VARIABLE TRANSMISSION, PARTICULARLY FOR A HEAVY-DUTY VEHICLE

The present invention relates to a continuously variable transmission which is automatically, mechanically controlled.

The present invention is particularly suitable for use on a "heavy-duty" or "utility" vehicle, which, in the following description, is intended to mean a four- or six-wheeled vehicle weighing over 450 kg, normally equipped with a body for loading materials, and which can be used as an off-road vehicle.

BACKGROUND OF THE INVENTION

Continuously variable transmissions (hereinafter referred to as a CVT) are known, which substantially comprise an input shaft; and a drive pulley connectable to the input shaft and comprising two half-pulleys defining a V groove of variable size to vary the wind diameter of a V belt. The pulley is located between a friction disk, connected rigidly to the input shaft, and a disk push plate angularly fixed but axially slidable with respect to the input shaft.

In automatic mechanical solutions, respective friction seals are interposed between each half-pulley and the friction disk and disk push plate, and a centrifugal control device cooperates with the disk push plate to move it axially towards the pulley by an amount varying as a function of the speed of the shaft.

More specifically, in one known solution, the control device comprises a hub fixed rigidly to the shaft; and a number of centrifugal weights carried by the hub and which exert centrifugal axial thrust on the disk push plate to first connect the pulley to the input shaft via the friction seals, and then gradually reduce the distance between the half-pulleys as the angular speed of the input shaft increases.

Known CVT transmissions of the type briefly described above are widely used on low-power motorcycles, in particular scooters, but have drawbacks when used, as frequently is the case, in higher-power applications, such as so-called minicars.

More specifically, response of the control device to variations in shaft speed, i.e. to the accelerator, is irregular and results in "tugging" of the transmission, which is clearly noticeable when accelerating and decelerating, and particularly at low engine speeds, when starting up and parking.

Another drawback of known transmissions is relatively severe wear of the belt, caused by the belt slipping with respect to the half-pulleys at start-up, when very little axial thrust is exerted on the half-pulleys by the control device.

To eliminate these drawbacks, CVT's for minicars have been devised in which the centrifugal control device comprises a centrifugal actuating device, which comes into play above a first input shaft angular speed threshold value to connect the drive pulley angularly to the flywheel by a friction clutch; and a speed regulator, which is activated above a second input shaft angular speed threshold value to vary the size of the drive pulley groove and, therefore, the work diameter of the belt.

SUMMARY OF THE INVENTION

It is an object of the present invention to further improve CVT's of the latter type to increase the torque transmittable at start-up, and so also make them suitable for heavier-duty applications.

BRIEF DESCRIPTION OF THE DRAWINGS

A preferred, non-limiting embodiment of the present invention will be described by way of example with reference to the accompanying drawings, in which:

FIG. 2 shows a section along line II-II in FIG. 1, in a first operating condition;

FIG. 5 shows a partial section along line V-V in FIG. 2;

FIG. 6 shows a diagram of a detail in FIG. 1.

DETAILED DESCRIPTION OF THE INVENTION

Figure 1:
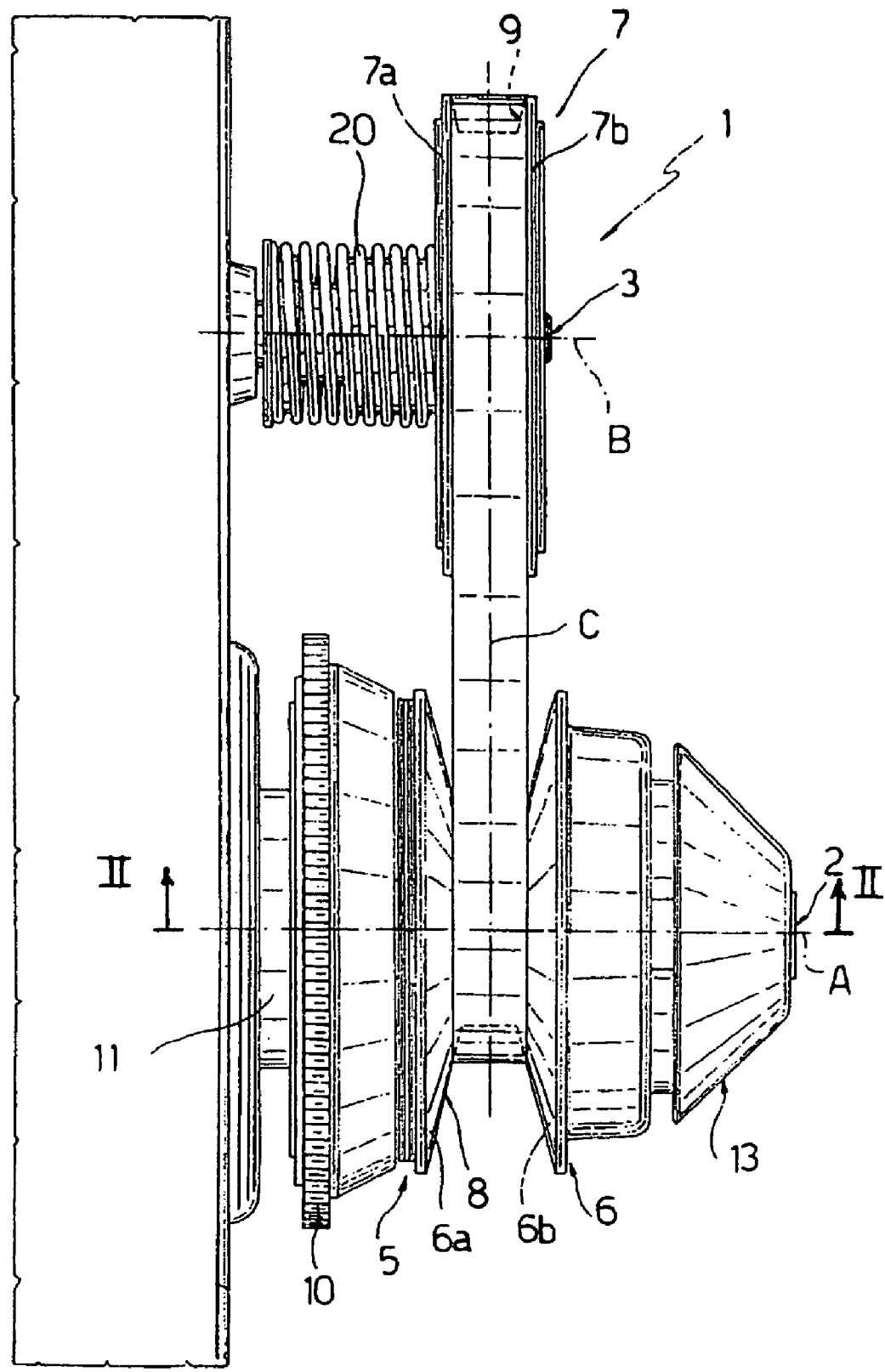
FIG. 1 shows a plan view of a transmission in accordance with the present invention.

Number 1 in FIG. 1 indicates as a whole an automatic, mechanical, variable-ratio transmission for a heavy-duty vehicle.

Transmission 1 comprises an input shaft 2 of axis A; an output shaft 3 of axis B parallel to axis A; a drive assembly 5 fitted to input shaft 2 and having a drive pulley 6 connectable to input shaft 2; and a driven pulley 7 fitted to output shaft 3.

Each pulley 6 and 7 comprises two half-pulleys 6a, 6b and 7a, 7b, which define respective grooves 8 of variable size for a V belt C.

Input shaft 2 is connected rigidly to a flywheel 10 fixable to a drive shaft (not shown) of the vehicle engine.

More specifically (FIG. 2), drive assembly 5 comprises a sleeve 15 fitted to input shaft 2 in rotary manner and with a limited amount of axial slide. A first half-pulley 6a is fixed rigidly to, e.g. connected to a first end 16 of sleeve 15 facing flywheel 10, and is therefore hereinafter referred to as "fixed half-pulley 6a"; and half-pulley 6b (hereinafter referred to as "movable half-pulley 6b") is fitted in axially-sliding manner to sleeve 15 to vary the width of groove 8 defined by half-pulleys 6a and 6b, and therefore the work diameter of belt C. The relative movement between half-pulley 6b and sleeve 15 is limited both axially and tangentially by a number of pins 18 projecting radially from and equally spaced angularly about sleeve 15, and which engage respective slots 19 formed in movable half-pulley 6b.

Slots 19 are identical, and form, with respective pins 18, a torque-sensitive compensating device 13. When developed on a plane, each slot (FIG. 6) is substantially in the form of a right-angle triangle with rounded corners, having a long side defined by a side 19a of the slot extending axially, a short side defining an axial end 19b of slot 19 facing away from fixed pulley 6a, and a hypotenuse defined by a sloping side 19c converging with side 19a at an end 19d of slot 19 facing fixed pulley 6a and engageable by respective pin 18 with substantially no tangential slack. Side 19a faces in the rotation direction of shaft 2 indicated by arrow R in FIG. 6.

Movable half-pulley 6b therefore slides axially between a maximum-distance position from fixed half-pulley 6a, in which each pin 18 contacts end 19d of respective slot 19 (position 18A, FIGS. 1, 2, 6), and which corresponds to the minimum work diameter of belt C; and a minimum-distance position from fixed half-pulley 6a, in which each pin 18 contacts end 19b of respective slot 19 (FIG. 4, position 18B), and which corresponds to a maximum work diameter of belt C. It should be pointed out that, in the first of the above relative axial positions, substantially no relative rotation between half-pulleys 6a, 6b is permitted, whereas, in the second relative axial position, relative rotation of an amount equal to the length of side 19b of each slot is permitted.

Belt C (FIG. 1) powers driven pulley 7, which is a reactive type; and half-pulleys 7a, 7b are loaded axially towards each other by a spring 20 in known manner, so as to automatically adapt the work diameter inversely to that of pulley 6. More specifically, when no force is exerted on half-pulleys 6a, 6b of drive pulley 6, spring 20 keeps half-pulleys 7a, 7b in the minimum-distance position corresponding to the maximum wind diameter of belt C. The pull on belt C ensures half-pulleys 6a, 6b of drive pulley 6 are kept in the maximum-distance position (FIGS. 1 and 2) corresponding to the minimum wind diameter of belt C.

A further spring 39, coaxial with sleeve 15 and compressed axially between half-pulleys 6a and 6b, may be used in the event the action of spring 20 is not sufficient. More specifically, spring 39 restores half-pulleys 6a, 6b to the maximum-distance position when the vehicle is braked sharply, in which case, pulleys 6 and 7 may not make the number of turns necessary to vary the wind diameters of the belt.

A friction disk 24 is fitted in angularly free manner to a flange 29 connected to fixed half-pulley 6a, is interposed axially between flywheel 10 and fixed half-pulley 6a, and comprises two peripheral annular friction face seals 25 and 26 facing a friction surface 14 of flywheel 10 and a friction surface 27 of fixed half-pulley 6a respectively. Friction disk 24 is maintained contacting friction surface 27 at all times by an annular spring 28, e.g. having an undulated or cup-shaped profile, interposed axially between friction disk 24 and a shoulder 30 of flange 29.

Friction disk 24 defines, with friction surfaces 14 and 27, a clutch 12 interposed between flywheel 10 and half-pulley 6a.

Sleeve 15 of drive assembly 5 is supported radially and in axially free manner on input shaft 2 by two supports 31, 32. One of the two supports (31) is defined by a bushing made of low-friction material; and the other (32) conveniently comprises a free wheel, which connects sleeve 15 to shaft 2 when the shaft tends to slow down with respect to it, e.g. when slowing down or going downhill (engine brake).

Drive assembly 5 is subjected to axial thrust by a spring 34 surrounding input shaft 2 and compressed between a shoulder 35 of input shaft 2 and drive assembly 5, more specifically a thrust ring 33 which slides along input shaft 2 and rests axially against a shoulder 36 connected to the end 37 of sleeve 15 opposite end 16, so as to keep seal 25 of friction disk 24 detached from friction surface 14 of flywheel 10. A stop ring 38, fixed to input shaft 2, defines the limit position of drive assembly 5 under the action of spring 34, so as to ensure a minimum axial clearance S between seal 25 and friction surface 14.

Figure 3:
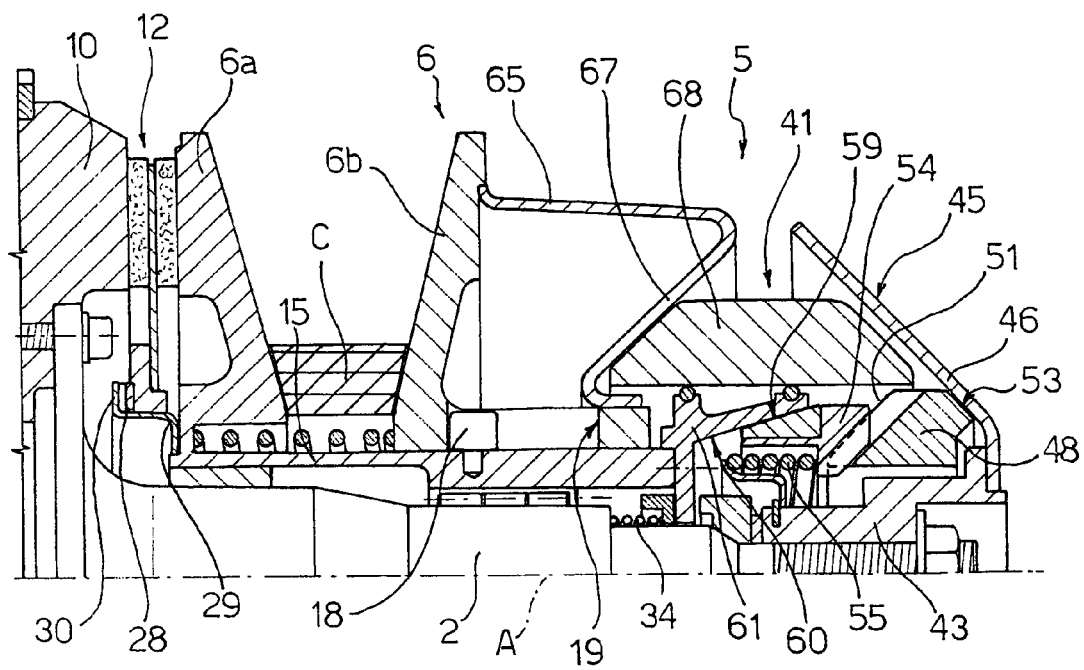
FIGS. 3 and 4 show partial axial sections, similar to FIG. 2, in a further two operating conditions.
Figure 4:
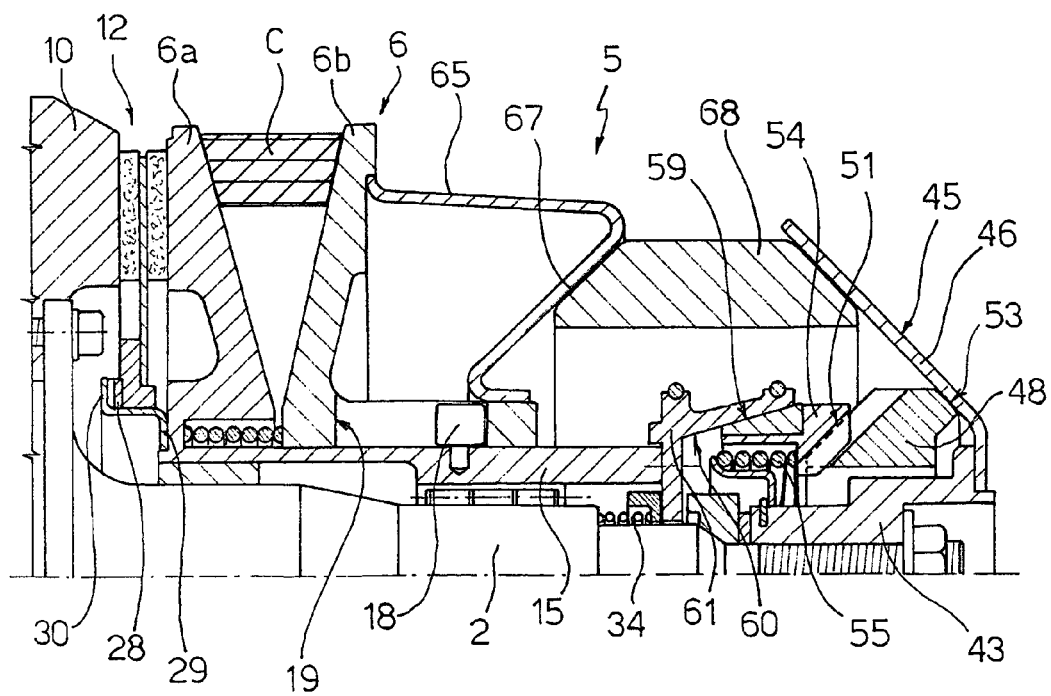

Axial slide of drive assembly 5 on input shaft 2 and of movable half-pulley 6b on sleeve 15 are controlled respectively by an actuating device 40 and a speed regulating device 41, which together form an automatic, centrifugal, mechanical actuating assembly 42 as shown in FIGS. 2, 3 and 4.

Actuating device 40 comprises a hub 43 fixed rigidly to the opposite end 44 of input shaft 2 to flywheel 10. A free end of hub 43 is fitted with a substantially cup-shaped reaction disk 45 having a conical lateral wall 46 extending towards movable half-pulley 6b so as to surround hub 43 and form with it a cavity 47.

Cavity 47 houses a number of, e.g. three, sector-shaped auxiliary weights 48 surrounding hub 43 and forming, in pairs, radial gaps 49 (FIG. 5). And three radial drive pins 50, projecting from hub 43 and equally spaced 120° apart, engage respective gaps 49 between auxiliary weights 48 to rotate the auxiliary weights.

Each auxiliary weight 48 is defined at the front, towards drive assembly 5, by a surface 51 sloping substantially 45°, and along the centreline of which is formed a radial recess 52 for the purpose explained later on. On the axially opposite side to surface 51, each auxiliary weight 48 has a peripheral bevel 53 having a conical profile matching the inner profile of lateral wall 46 of reaction disk 45.

Auxiliary weights 48 cooperate with an actuating ring 54, which is coaxial with hub 43, is loaded by a spring 55 towards auxiliary weights 48, and has a conical face surface 56 having a profile matching that of front surfaces 51 of the weights. On surface 56 are formed three projecting radial ribs 57 (one shown in FIG. 2) which engage respective recesses 52 in auxiliary weights 48 (FIG. 5) to connect auxiliary weights 48 prismatically to actuating ring 54.

Actuating ring 54 comprises a friction seal 58 having a conical friction surface 59 located on the axially opposite side to auxiliary weights 48, i.e. facing and tapering towards drive assembly 5.

Friction surface 59 axially faces a matching conical friction surface 60 formed in a tubular appendix 61 projecting axially inside cavity 47 from sleeve 15 and fixed rigidly to the sleeve, e.g. by a number of axial screws not shown. On the outside, appendix 61 has two circumferential seats for respective rings 63 of elastomeric material, e.g. O-rings, for the purpose explained later on. Conveniently, appendix 61 also integrally defines shoulder 36, on which spring 34 acts by means of ring 33.

Actuating ring 54 defines a thrust member of actuating device 40, and is subjected to the axial thrust of spring 55, which is interposed between ring 54 and a plate 64 fixed to input shaft 2. Spring 55 performs the dual function of keeping actuating ring 54, and in particular friction surface 59 of seal 58, detached from friction surface 60 of appendix 61, and keeping auxiliary weights 48 in a rest position contacting hub 43.

Speed regulating device 41 comprises an annular push disk 65 fixed rigidly to a rear face 66 of movable half-pulley 6b facing reaction disk 45. Push disk 65 is conveniently pressed from sheet metal, and comprises a conical face wall 67 facing conical wall 46 of reaction disk 45 and having the same but opposite taper to wall 46.

Speed regulating device 41 also comprises a number of main weights 68 housed between walls 46 and 67 and equally spaced angularly about tubular appendix 61. Weights 68 have a section substantially in the shape of an outwardly-tapering isosceles trapezium, and are each defined axially by two face surfaces 70, 71 facing respective walls 67 and 46.

Weights 68 are secured to rotate with and slide radially with respect to movable half-pulley 6b in conventional manner, e.g. by means of prismatic guides (not shown) connected to movable half-pulley 6b. Weights 68 are also secured elastically to movable half-pulley 6b by respective pairs of pull springs 69 (shown schematically in FIG. 2), which exert inward radial pull on weights 68 to keep them in radial contact with rings 63, and exert axial pull towards wall 67 of push disk 65 to prevent undesired contact between weights 68 and wall 46 of reaction disk 45.

Transmission 1 operates as follows.

When the engine is idling (FIG. 2), spring 34 keeps drive assembly 5 in such a position as to disengage clutch 12, i.e. with shoulder 36 resting axially against stop ring 38, and with friction disk 24 detached from flywheel 10.

Actuating device 40 rotates with input shaft 2. Auxiliary weights 48 are maintained in a radially withdrawn position, contacting hub 43, by actuating ring 54, which in turn is pushed axially by spring 55 against auxiliary weights 48, so that friction surface 59 of friction seal 58 is detached from friction surface 60 of appendix 61.

Drive assembly 5 therefore does not rotate, and, with it, regulating device 41 remains stationary with main weights 68 maintained by springs 69 in the radially withdrawn position contacting rings 63 and detached from reaction disk 45.

Spring 20 of driven pulley 7 keeps pulley 6 in the position corresponding to the minimum work diameter of belt C.

As engine speed increases, and on reaching a first predetermined threshold speed, e.g. 1200-1400 rpm, the centrifugal force of auxiliary weights 48 of actuating device 42 overcomes the elastic reaction of spring 55, and auxiliary weights 48 move radially outwards and move actuating ring 54 axially towards drive assembly 5 (FIG. 3) by the combined effect of the conical coupling of bevels 53 of auxiliary weights 48 with conical wall 46 of reaction disk 45, and the conical coupling of face surfaces 51 of auxiliary weights 48 with surface 56 of actuating ring 54. The engine speed at which actuating device 42 comes into play may be selected by appropriately sizing auxiliary weights 48 and spring 55.

Once the initial axial clearance is taken up, friction surface 59 of friction ring 58 carried by actuating ring 54 cooperates with friction surface 60 of appendix 61 to push the entire drive assembly 5 axially towards flywheel 10 in opposition to the elastic reaction of spring 34.

The axial movement of drive assembly 5 eliminates the initial axial clearance S between friction disk 24 and friction surface 14 of flywheel 10, so that drive assembly 5 is connected to flywheel 10, and therefore with input shaft 2, thus starting up the vehicle.

It is important to note how the axial force exerted by actuating ring 54 is transmitted directly by appendix 61 and sleeve 15 to fixed half-pulley 6a, so that, during start-up, which is when maximum torque transmission is required, the thrust exerted on clutch 12 increases gradually as engine speed increases.

Main weights 68 are therefore rotated together with drive assembly 5. In response to a further increase in engine speed over and above a second predetermined threshold speed, main weights 68 overcome the elastic force of springs 69 and begin moving radially outwards. Once the clearance is taken up, end faces 70, 71 of weights 68 exert thrust on conical wall 67 of push disk 65 and on conical wall 46 of reaction disk 45; and, since reaction disk 45 is axially fixed, the centrifugal radial movement of weights 68 moves push disk 65, and therefore movable half-pulley 6b, axially towards fixed half-pulley 6a to gradually reduce the width of groove 8, and so gradually increase the work diameter of belt C to a maximum diameter (FIG. 4) defined by pins 18 contacting ends 19b of respective slots 19 (position 18B in FIG. 6).

When accelerating, half-pulley 6a, driven directly by clutch 12, is the driver with respect to movable half-pulley 6b, so that pins 18 remain contacting axial sides 19a of respective slots 19 (FIG. 6).

When engine speed falls, the above operating steps are performed in reverse order. Rings 63 of soft material provide for deadening the stop noise of main weights 68 when pulled back by springs 69.

If the accelerator is released, so that the engine runs at minimum speed, the vehicle drives the engine which acts as a brake. At this stage, free wheel 32 overoperates, and fixed half-pulley 6a is connected to input shaft 2. Half-pulley 6b is now the driver, and pins 18 move into contact with the sloping sides 19c of respective slots 19, which define respective deceleration cams (position 18C in FIG. 6). A contact force F is thus generated, the axial component Fa of which increases the axial contact force between half-pulleys 6a, 6b and belt C. Compensating device 13 therefore enables compression of the internal combustion engine to be put to full use for braking, by preventing belt C from slipping with respect to the sides of half-pulleys 6a, 6b.

Clearly, changes may be made to transmission 1 as described herein without, however, departing from the scope of the accompanying Claims.

In particular, compensating device 13 may even be used without free wheel 32.

The invention claimed is:

1. An automatic, mechanical, continuously variable transmission (1) comprising
    an input shaft (2);
    a flywheel (10) connected to the input shaft;
    a drive assembly (5) including a drive pulley (6) defined by a first half-pulley (6a) and a second half-pulley (6b) which define a groove (8) of variable width for driving a belt (C);
    friction clutch means (12) interposed axially between said first half-pulley (6a) and said flywheel (10);
    a centrifugal actuating assembly (42) comprising
        a centrifugal actuating device (40) controlling said clutch means (12); said actuating device (40) including push means (54, 61) for exerting an axial thrust on said first half-pulley (6a) through a force transmitting path not including the second half-pulley when an angular speed value of said input shaft (2) is greater than a first threshold value so as to connect said drive pulley (6) to said flywheel (10), and
        a speed regulating device (41) for moving said second half-pulley (6b) axially with respect to said first half-pulley (6a) to adjust the width of the groove (8) of the drive pulley (6) in response to speed variations of said input shaft (2), said speed regulating device (41) being active only when the angular speed value of said input shaft (2) is above a second threshold value; said second threshold value being higher than said first threshold value.

2. A transmission as claimed in claim 1, wherein said drive assembly (5) comprises a sleeve (15) fitted to said input shaft (2); said first half-pulley (6a) being fixed with respect to said sleeve (15); and the second half-pulley (6b) being fitted in sliding manner to said sleeve (15).

3. A transmission as claimed in claim 2, further comprising a free wheel (32) interposed between said input shaft (2) and said sleeve (15).

4. A transmission as claimed in claim 1, wherein said clutch means (12) comprises a friction disk (24) interposed axially between said first half-pulley (6a) and said flywheel (10).

5. A transmission as claimed in claim 4, wherein said actuating device (40) comprises a number of auxiliary weights (48) rotating with said input shaft (2); said push means (54, 61) being interposed between said auxiliary weights (48) and said sleeve (15) to move said first half-pulley (6a) towards said flywheel (10) and to grip said friction disk (24) between said flywheel (10) and said first half-pulley (6a).

6. A transmission as claimed in claim 5, further comprising a reaction disk (45) connected to the input shaft (2) and having a conical wall (46); said actuating device (40)

comprising a number of centrifugal auxiliary weights (48) cooperating with said conical wall (46); said push means (54, 61) of said actuating device (40) comprising an actuating ring (54) having a conical surface (56) facing said conical wall (46) of said reaction disk (45); and said auxiliary weights (48) having respective conical face surfaces (51, 53) cooperating respectively with said conical surface (56) of said actuating ring (54) and with said conical wall (46) of said reaction disk (45) to move said actuating ring (54) axially towards said sleeve (15) by virtue of the radial movement of said auxiliary weights (48).

7. A transmission as claimed in claim 6, wherein said actuating device (40) comprises a tubular drive member (61) connected to said sleeve (15); said actuating ring (54) and said tubular member (61) having respective facing, complementary conical friction surfaces (59, 60).

8. A transmission as claimed in claim 6, wherein said speed regulating device (41) comprises a push disk (65) connected to said second half-pulley (6b) and having a conical wall (67) facing said conical wall (46) of said reaction disk (45); and a number of main weights (68) having respective conical face surfaces (70, 71) cooperating with said conical walls (46, 67) to move said push disk (65) axially towards said flywheel (10) by radial movement of said main weights (68).

9. A transmission as claimed in claim 1, further comprising a torque-sensitive compensating device (13) acting between said half-pulleys (6a, 6b).

10. A transmission as claimed in claim 9, wherein said second half-pulley (6b) is fitted to said sleeve (15) to slide within limits defined by said compensating device (13).

11. A transmission as claimed in claim 10, wherein said compensating device (13) comprises at least one radial pin (18) connected to said sleeve (15) and a hub of said second half-pulley (6b); and at least one corresponding slot (19) formed in in said sleeve and said hub of said second half-pulley (6b).

12. A transmission as claimed in claim 11, wherein said slot (19) is defined circumferentially by an axial side (19a) which cooperates with said pin (18) when accelerating, and by a sloping side (19c) which cooperates with said pin (18) when decelerating, to generate additional axial thrust acting between said half-pulleys (6a, 6b) in the axial compression direction of the belt (C).

13. A transmission as claimed in claim 1, wherein the first threshold value is between 1200-1400 rpm.

14. An automatic, mechanical, continuously variable transmission comprising:

an input shaft;

a flywheel connected to the input shaft;

a drive assembly connectable to the flywheel, the drive assembly including a drive pulley defined by a first half-pulley and a second half-pulley which define a groove of variable width for driving a belt;

a clutch interposed axially between the first half-pulley and the flywheel;

a centrifugal actuating assembly comprising:

a centrifugal actuating device controlling the clutch means; the actuating device including a first set of weights engaging a push means for exerting an axial thrust through the push means on the first half-pulley when an angular speed value of the input shaft is greater than a first threshold value so as to connect the drive pulley to the flywheel, and a speed regulating device for moving the second half-pulley axially with respect to said first half-pulley to adjust the width of the groove of the drive pulley in response to speed variations of said input shaft, the speed regulating device including a second set of weights engaging a push disk for exerting an axial thrust through the push disk on the second half-pulley when the angular speed value of the input shaft is above a second threshold value; the second threshold value being higher than the first threshold value.

\* \* \* \* \*